Aug. 14, 1962
K. C. CORMIA ET AL
3,049,214
ELECTRON TUBE ASSEMBLY APPARATUS
Filed Sept. 22, 1959
2 Sheets-Sheet 1
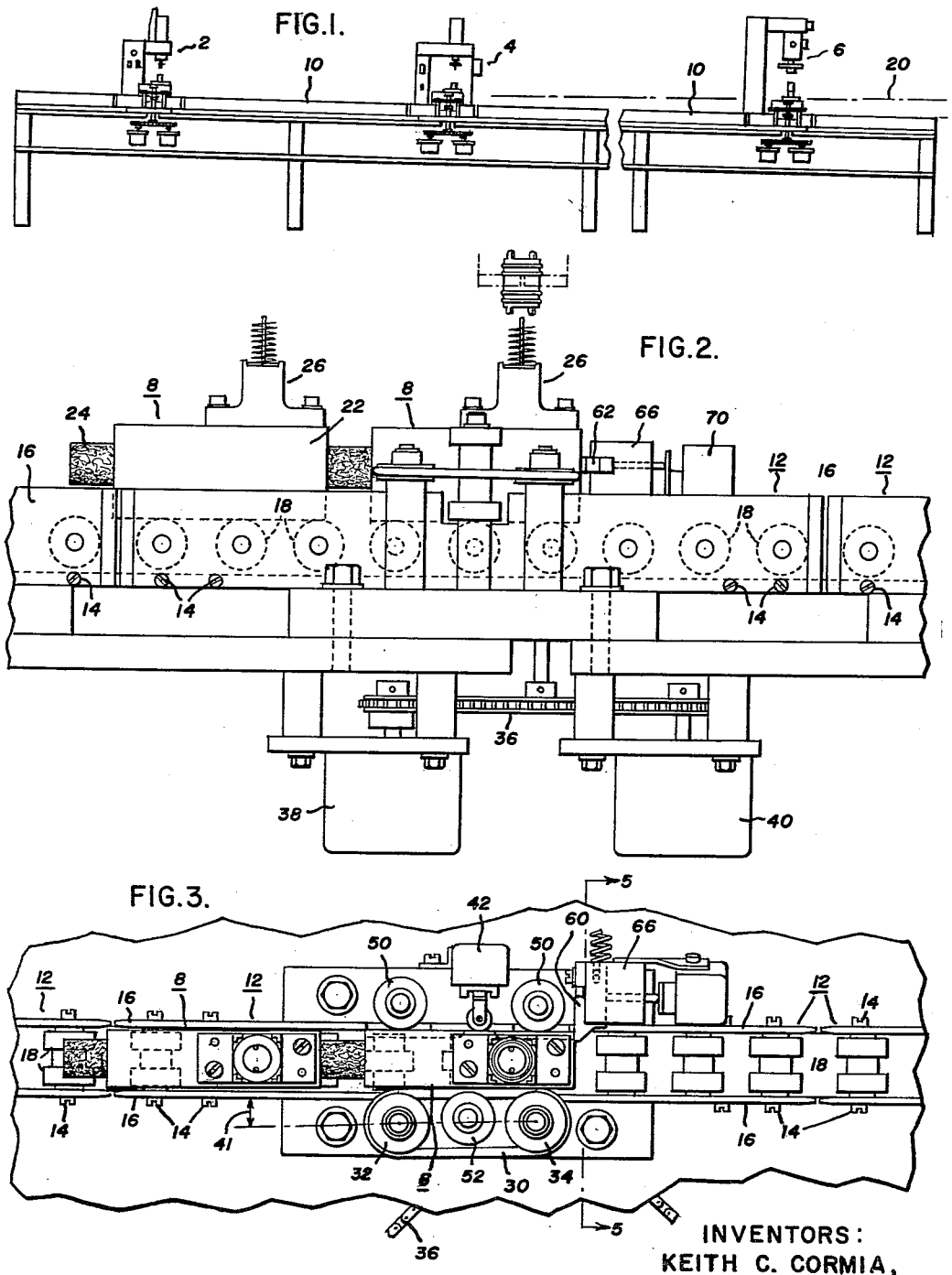
INVENTORS:
KEITH C. CORMIA,
ALANSON D. AIRD,
BY Robert J. Mooney
THEIR ATTORNEY.

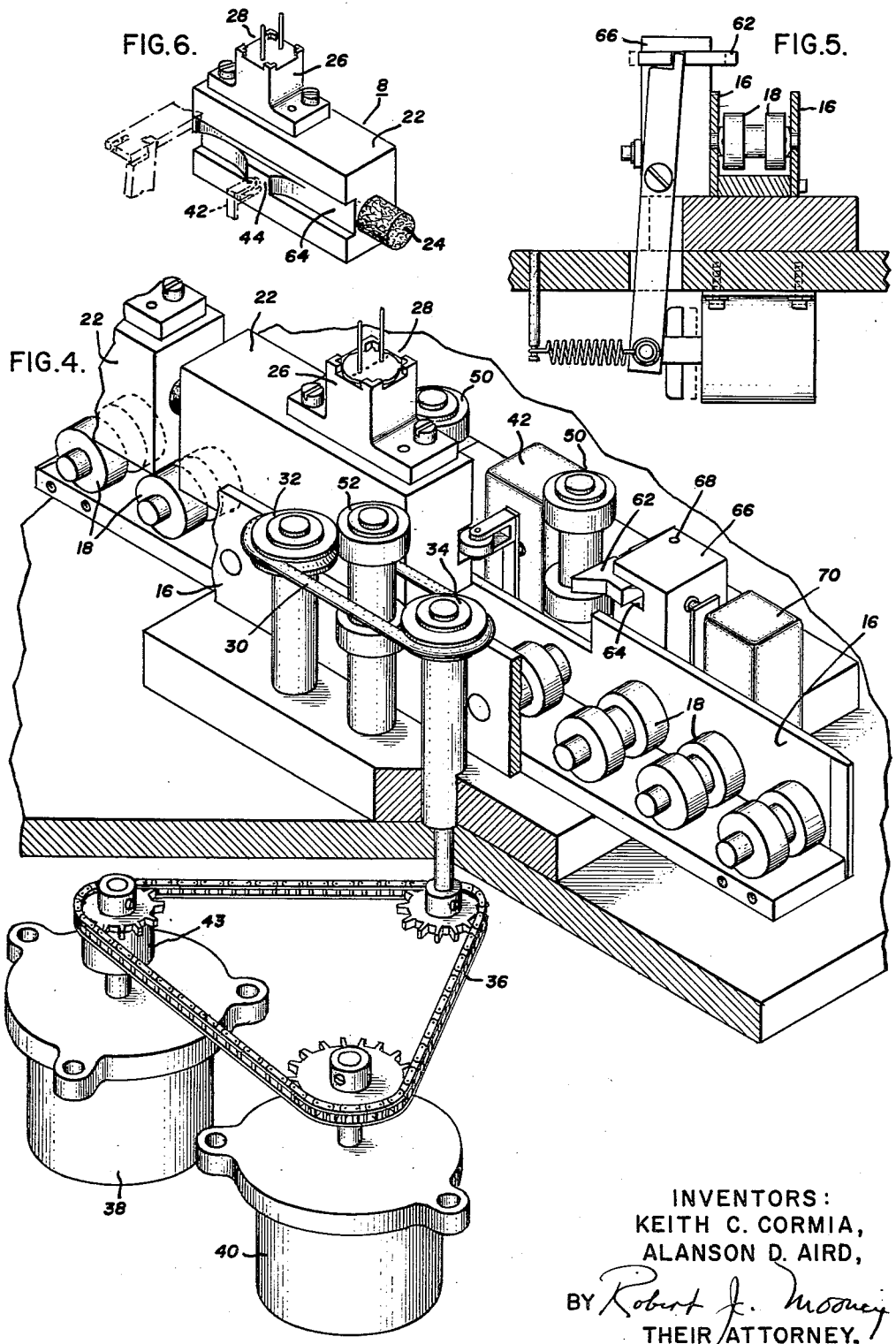

United States Patent Office 3,049,214
Patented Aug. 14, 1962

3,049,214
ELECTRON TUBE ASSEMBLY APPARATUS
Keith C. Cormia and Alanson D. Aird, Scotia, N.Y., assignors to General Electric Company, a corporation of New York
Filed Sept. 22, 1959, Ser. No. 841,509
13 Claims. (Cl. 198—19)

The present invention relates to the manufacture of electron tubes and more particularly to workpiece conveying and positioning apparatus particularly suitable for use with traveling fixtures on which electron tube parts may be successively assembled.

In the manufacture of electron tubes it is convenient to employ a plurality of work stations from one to the next of which a workpiece or subassembly is successively transferred. At any one work station a particular work operation may be performed or a particular part may be added to the successively arriving work pieces or subassemblies. For efficient high volume manufacture it is desirable to convey a workpiece or assemblage of parts from one work station to the next on its own carrier fixture, such fixtures serving as temporary supports and orienting devices for the parts thereon. Efficient automatic transfer of carrier fixtures from work station to work station has long been sought, but the often small size and fragile nature of the electron tube parts, the need for adherence to relatively close tolerances in positioning and spacing of parts during assembly, and the resulting undesirability of using apparatus involving violent motion or large forces makes many types of conventional apparatus unsuitable. The problem is further complicated by the need for apparatus adaptable to a variety of tube types whose parts may vary in size, shape and number of work operations required.

A principal object of this invention is to provide workpiece transfer and positioning apparatus which is particularly suitable for electron tube assembly and by which carrier fixtures may be conveyed from one of a plurality of work stations to a precisely located position at the next, automatically, quickly, and with a minimum of shock or vibration.

Another object is to provide transfer and positioning apparatus for electron tube manufacture which automatically achieves uniformly precise induction to and positioning at each work station of workpiece carrier fixtures, such that work operations to the required close tolerances may thereafter be performed without further adjustment of workpiece position.

Another object is to provide conveying and positioning apparatus of the foregoing character which is readily adaptable to accommodate any desired number of work stations, and which may be readily dismantled and reassembled with a minimum of time, effort and cost, and with a minimum of readjustment.

Another object is to provide apparatus of the foregoing character which is comparatively light in weight and low in cost, and which will operate reliably for long periods without repair or adjustment.

Another object is to provide fixture transfer and positioning apparatus which is demand-responsive such as to insure swift precise feeding of successive fixtures to a given work station as demanded without in any way accelerating or otherwise adversely affecting operations at other work stations, and which affords adequate time for desired manual operations, including inspection or removal of individual fixtures or workpieces, with resulting manufacturing flexibility and optimum operator safety and comfort.

These and other objects of the invention will be apparent from the following description taken in conjunction with the accompanying drawings wherein:

FIG. 1 is a view to a diminished scale of conveying and positioning apparatus constructed according to the present invention in association with a plurality of exemplary machines for performing respective work operations at successive spaced work stations;

FIG. 2 is a fragmentary front view of conveying and positioning apparatus constructed according to the invention;

FIG. 3 is a plan view of the structure shown in FIG. 2;

FIG. 4 is an enlarged partially cut away perspective view of the structure shown in FIGURES 2 and 3;

FIG. 5 is an enlarged fragmentary sectional view of the structure of FIG. 3 taken on the line 5—5 thereof; and FIG. 6 is a diminished fragmentary perspective view of the reverse side of a portion of the structure shown in FIG. 4.

Briefly, the transfer and positioning apparatus of the present invention employs, in association with a gravity roller or other suitable conveyor extending between work stations along which successive workpiece carrier fixtures may travel freely and independently, a continuously operating drive means at each work station which progressively engages an arrived or arriving fixture and smoothly changes the forward velocity of the fixture in a vibration and shock free manner to a predetermined low velocity, and then drives the fixture into precisely located position for proper performance of the desired work or assembly operation. The drive means further serves to expel or discharge a fixture as to which a work operation has been completed. Additionally the drive means draws into operating position in the work station as demanded fixtures which may have become lined up in the conveyor adjacent the entrance side of the work station.

Turning to FIG. 1, one form of electron tube assembly apparatus with which the present invention is particularly suitable includes a plurality of successive work stations provided with machines 2, 4, 6, etc. each intended to perform a particular work or assembly operation. Successive workpiece-carrying fixtures 8 are conveyed from one work station to the next along a suitable conveyor such as a gravity roller conveyor 10, which preferably may consist of a plurality of convenient-length substantially identical sections 12, joined together by suitable fasteners 14. Each section includes a pair of parallel side walls 16 and is floored with rollers, as best shown at 18 in FIG. 4, which may be ball bearing mounted. For reliable self-transport of successive fixtures from one work station to the next by gravity, the conveyor is slightly inclined to the horizontal as shown by the horizontal reference line 20.

An exemplary individual fixture 8 is shown in FIG. 6, and includes a base 22, which may be a block of metal having sufficient mass to facilitate good gravity transfer. If desired the rollers 18 may be placed on the fixture 8 instead of the conveyor floor. To preclude shock from collision with an adjacent fixture, each fixture is preferably provided with a bumper or shock absorber 24, which may be a piece of plastic foam. For the assembly of receiving tube parts of the base 22 is provided with a head 26 having positioning and supporting members 28 onto which successive parts may be applied at successive work stations to form an individual electron tube electrode subassembly, hereinafter called a cage. A cage may include for example one or more coated cathodes, associated grid electrodes, one or more plate electrodes and associated supporting structure such as mica wafers by which the individual parts are supported in proper position relative to each other.

Turning now to FIGS. 2 and 3, a particular feature of the present invention is means for providing controlled arresting of each individual fixture 8 on arrival at a particular work station and positively locating the fixture in precise position for proper performance of the associated work operation. As best shown in FIG. 3 positive acquisition of control of an arriving fixture is provided by an endless friction belt 30 of resilient material driven on pulleys 32, 34 by a sprocket and chain connection 36 to one or more suitable drive motors 38, 40, hereinafter more fully described. The pulleys 32, 34 are so located and driven that the inner course of the belt 30 extends along and slightly above the top of one side wall of the conveyor 10, runs in the same general direction as an arriving fixture, and is disposed for resilient frictionally engaging relation with the adjacent side face of an arriving fixture 8. The belt 30 thus serves to modify the forward speed of an arriving fixture to a predetermined value, either by decelerating it if it is moving too fast or accelerating it if it is stationary or moving too slow, such speed change being made smoothly because of the friction clutch-like action of the belt. To further enhance the smooth clutching effect between the belt and a fixture, the belt has a slight transverse angle with respect to the conveyor, as shown in exaggerated fashion at 41 in FIG. 3, which permits the belt to engage a fixture with progressively increasing frictional force as the fixture moves from left to right in FIG. 3.

For the purpose of further contributing to uniformly smooth, shock-free arresting of the arriving fixture 8, not only does the belt 30 engage the fixture in the manner of a friction clutch, but also the belt itself may be driven at a plurality of speeds, gradually lowered as the fixture is driven forward closer to its totally arrested position. To this end motor 40 is arranged to operate as a high speed motor and motor 38 is a low speed motor. Motor 40 drives the belt during the period of initial, low-friction, high-slip, engagement of the belt with an arriving fixture, while an overrunning clutch 43 prevents low speed motor 38 from acting as a drag on motor 40. As the arriving fixture is driven toward its arrested position by the belt 30, through actuation of a micro switch 42 by a cam lobe 44 on the fixture itself the motor 40 is deenergized and motor 38 energized so that the drive speed of the belt is changed from high speed to low speed. Thus speed change of the arriving fixture is controlled uniformly and automatically by the fixture itself. The motors 38, 40 may be of any suitable continuously stallable type, such as for example capacitor-start induction motors.

The slight transverse angle of the belt as shown in FIG. 3 also contributes to precise location of an arrested fixture by enabling the belt to force an engaged fixture gently but firmly against a pair of backup rollers 50 on the opposite side of the conveyor. This precisely locates the fixture in a direction transverse to the track. An additional pair of rollers 52 engages the fixture in arrested position on the side face opposite rollers 50, and is so spaced from rollers 50 as to provide substantially zero play, so that the fixture is effectively locked transversely between rollers 50 and rollers 52. If desired, to urge an engaged fixture downward against the rollers 18 forming the floor of the conveyor 10, the belt 30 may also be angled downwardly toward the conveyor floor from left to right, as shown in exaggerated fashion in FIG. 2.

Precisely accurate location of the arriving fixtures in the longitudinal direction is insured by a stop 60 which is disposed in the path of the forward face of the arriving fixture as it is driven toward arrested position by the belt 30. The stop 60 forms one end of a finger 62 pivotally and transversely slidably mounted in a groove 64 on a stationary block 66 by means of a pin 68 extending through a slot in the finger 62.

As the fixture is driven home by the belt 30 the finger 62 is displaced to a position seated against the back wall of groove 64. This provides precise longitudinal location of the fixture in arrested position, and the corresponding actuation of a micro switch 70 by the pivoting movement of finger 62 initiates actuation of the associated apparatus at the work for performing a desired work operation.

When the desired work operation is completed, energization of a solenoid actuates a lever, as best shown in FIG. 5, which withdraws the stop in a transverse direction from engagement with the forward face of the fixture, and the continuously running belt then drives the fixture forward out of the work station. The fixture is then transported by gravity or other suitable means to the next work station. After leaving the last work station of a series, the fixtures are unloaded and may then be returned by any suitable means, such as a belt conveyor, to the beginning of the series of work stations for reuse with fresh workpieces.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What we claim as new and desire to secure by Letters Patent of the United States is:

1. Apparatus for arresting and precisely positioning a moving workpiece-carrier fixture comprising fixture-engageable locating surfaces arranged to define a precision fixture position in the path of a moving fixture, drive means frictionally engageable with a moving fixture during approach movement of the fixture toward said locating surfaces for driving a fixture into said precision position, and means for controlling the speed of said drive means.

2. Apparatus for arresting a moving workpiece-carrier fixture comprising a stop mounted in the path of the fixture, drive means frictionally engageable with a moving fixture responsive to approach movement of the fixture toward the stop for changing to a predetermined pattern the speed of advance of the fixture to the stop, and means for controlling the speed of the drive means in accordance with said predetermined pattern.

3. Apparatus for arresting a moving workpiece-carrier fixture comprising a stop mounted in the path of the fixture, drive means mounted in the path of the fixture for frictional slip-clutching engagement with a moving fixture during approach movement of the fixture toward the stop, and means for controlling the speed of the drive means in accordance with a predetermined pattern responsive to the position relative to the stop of a fixture engaged by the drive means.

4. Apparatus for arresting and accurately positioning a moving workpiece-carrier fixture comprising fixture positioning surfaces mounted in the path of the fixture for engagement with mutually orthogonally facing surfaces of an arrested fixture for precision positioning thereof, drive means mounted in the fixture path for frictional slip clutching engagement with an approaching fixture during movement of the fixture toward said fixture positioning surfaces, means for operating the drive means to drive a fixture engaged thereby toward said fixture positioning surfaces, and means for controlling the speed of the drive means responsive to the position of the driven fixture relative to said fixture positioning surfaces.

5. Apparatus for arresting a moving workpiece-carrier fixture comprising a stop mounted in the path of the fixture for engagement therewith, drive means including a continuously moving resilient endless belt mounted in the fixture path for movement toward the stop and for friction clutching engagement with a moving fixture approaching the stop, and means for controlling the speed of the belt toward the stop.

6. Apparatus for arresting and accurately positioning a moving workpiece-carrier fixture comprising a stop mounted in the longitudinal path of the fixture for engagement therewith, fixture-locating surfaces adjacent the stop engageable with the side and bottom of an arrested fixture for precision location thereof in directions orthogonal to the longitudinal direction, continuously operating drive means mounted for friction clutching engagement with a fixture approaching the stop, means for operating the drive means to drive a fixture engaged thereby toward the stop, and means for disengaging the stop from an arrested fixture responsive to a control signal whereby the arrested fixture is expelled from its precisely located position by the drive means.

7. Apparatus for arresting and accurately positioning a moving workpiece-carrier fixture comprising a stop mounted in the longitudinal path of the fixture for engagement therewith, fixture locating surfaces adjacent the stop engageable with surfaces of the fixture mutually orthogonal to the longitudinal path thereof for precision location thereof, drive means including a resilient endless belt mounted for friction clutching engagement with a fixture approaching the stop, means for operating the drive means to drive a fixture engaged by the belt toward the stop, the course of said belt engageable with a fixture being slightly angled relative to said longitudinal path to progressively urge a driven fixture against said locating surfaces as it is driven toward said stop, and means for controlling the speed of the belt responsive to the position of the driven fixture relative to the stop.

8. Electron tube assembly apparatus comprising a plurality of longitudinally separated work stations, conveyors connecting adjacent stations and providing a longitudinal transfer path from the exit of one station to the entrance of the next station for transported workpiece carrier fixtures, and means at each work station for inducting and arresting a moving workpiece-carrier fixture including a stop mounted in the longitudinal path of the fixture, longitudinal drive means clutchably engageable with a fixture at the work station entrance, and means for controlling the speed of the drive means toward the stop in accordance with a predetermined pattern.

9. Electron tube assembly apparatus comprising a plurality of work stations, conveyors connecting adjacent stations and providing a transfer path from the exit of one station to the entrance of the next station for transported workpiece-carrier fixtures, and means at each work station for inducting and arresting a moving workpiece-carrier fixture including a stop mounted in the path of the fixture, drive means including a continuously moving endless belt clutchably engageable with a fixture at the work station entrance for changing to a predetermined pattern the speed of advance of the fixture toward the stop, and means for controlling the speed of the drive means responsive to the position relative to the stop of a fixture engaged by the drive means.

10. Electron tube assembly apparatus comprising a plurality of work stations, gravity roller conveyors connecting adjacent stations and providing a transfer path from station to station for gravity transported workpiece-carrier fixtures, means at each work station for inducting and arresting a moving workpiece-carrier fixture including a stop mounted in the path of the fixture, drive means including a resilient endless belt mounted for friction clutching engagement with a fixture approaching the stop, and means for controlling the speed of the belt toward the stop.

11. Electron tube assembly apparatus comprising a plurality of work stations, gravity roller conveyors connecting adjacent stations and providing a transfer path from station to station for gravity transported workpiece-carrier fixtures, and means at each work station for arresting and precisely positioning a moving workpiece-carrier fixture including a plurality of fixture engageable locating surfaces arranged to define a precision fixture position in the path of a fixture at each work station, drive means for driving a fixture into said precision position, said drive means including a continuously moving endless belt of resilient material disposed for frictional engagement with a fixture approaching said precision position, a high speed motor and a low speed motor for driving said belt, means for controlling the energization of said motors responsive to the position of a driven fixture relative to said precision position, and means at each work station for withdrawing said stop from engagement with an arrested fixture responsive to completion of a work operation whereby the arrested fixture is expelled from its precisely located position by the drive means.

12. Electron tube assembly apparatus comprising a plurality of work stations, gravity roller conveyors connecting adjacent stations and providing a transfer path from station to station for gravity transported workpiece-carrier fixtures, and means at each station for arresting and accurately positioning a gravity-transported workpiece-carrier fixture comprising a stop mounted in the longitudinal path of the fixture for engagement therewith, fixture-locating surfaces adjacent the stop engageable with an arrested fixture for precision location thereof in directions orthogonal to the longitudinal direction, continuously operating drive means mounted for friction clutching engagement with a fixture approaching the stop, means for operating the drive means to drive a fixture engaged thereby toward the stop, means for varying the speed of the drive means responsive to the position of a driven fixture relative to the stop, and means for disengaging the stop from an arrested fixture responsive to a control signal, whereby the arrested fixture is expelled from its precisely located position by the drive means.

13. Electron tube assembly apparatus comprising a plurality of work stations, means connecting adjacent stations and providing a transfer path from station to station for workpiece-carrier fixtures, fixture engageable locating surfaces at each station arranged to define a precision fixture position at said station in the longitudinal path of an arriving fixture, drive means mounted for friction clutching engagement with a fixture approaching said locating surfaces, means for operating the drive means to displace a fixture engaged thereby into said precision fixture position, and means for controlling the speed of the drive means responsive to the position of a driven fixture relative to said precision fixture position.

References Cited in the file of this patent

UNITED STATES PATENTS

| | | |
|---|---|---|
| 2,683,521 | Reynolds | July 13, 1954 |
| 2,884,684 | Wolke | May 5, 1959 |